United States Patent [19]

Ishikawa

[11] Patent Number: 5,758,326
[45] Date of Patent: May 26, 1998

[54] ELECTRONIC CASH REGISTER FOR TRANSMITTING MESSAGES BETWEEN CASH REGISTERS AND/OR HOST COMPUTER

[75] Inventor: Kenichi Ishikawa, Yokohama, Japan

[73] Assignee: Matsushita Electric Industrial Co., Ltd., Osaka, Japan

[21] Appl. No.: 455,659

[22] Filed: May 31, 1995

Related U.S. Application Data

[63] Continuation of Ser. No. 135,345, Oct. 13, 1993, abandoned.

[30] Foreign Application Priority Data

Oct. 20, 1992 [JP] Japan ................................. 4-281478

[51] Int. Cl.⁶ .................................................. G06F 17/60
[52] U.S. Cl. ................................................... 705/16
[58] Field of Search ............................. 364/405; 705/16

[56] References Cited

U.S. PATENT DOCUMENTS

| | | |
|---|---|---|
| 3,631,403 | 12/1971 | Asbo et al. |
| 3,921,148 | 11/1975 | Ophir et al. ................. 340/172.5 |
| 4,319,326 | 3/1982 | Uchida |
| 4,468,750 | 8/1984 | Chamoff et al. |
| 4,502,120 | 2/1985 | Ohnishi et al. |
| 4,771,382 | 9/1988 | Shiono et al. |
| 4,841,442 | 6/1989 | Hosoyama et al. |
| 4,873,631 | 10/1989 | Nathan et al. ............. 364/405 |
| 4,875,163 | 10/1989 | Ishii |
| 4,887,209 | 12/1989 | Sugishima |
| 4,893,237 | 1/1990 | Uhno |
| 5,051,899 | 9/1991 | Ikoma et al. |
| 5,053,957 | 10/1991 | Suzuki |
| 5,265,033 | 11/1993 | Vajk et al. |

FOREIGN PATENT DOCUMENTS

| | | | |
|---|---|---|---|
| 57-176473 | 1/1983 | Japan ............. | G06F 15/21 |
| 57176473 | 1/1983 | Japan | |
| 1321560 | 12/1989 | Japan | |

*Primary Examiner*—Gail O. Hayes
*Assistant Examiner*—William N. Hughet
*Attorney, Agent, or Firm*—Watson Cole Stevens Davis P.L.L.C.

[57] ABSTRACT

An electronic cash register is provided with a registration section, a display section, a memory and a control section, thereby making it possible to easily and surely inform a register operator of a message set by a manager. In a registration wait condition, the judgement is made as to whether or not message data has been registered in the memory. In the case where the message data has been registered, the message data is displayed by the display section. By further providing a transmission/reception section for making transmission to or reception from a plurality of electronic cash registers or a host computer, it is possible to transfer message data.

8 Claims, 7 Drawing Sheets

ELECTRONIC CASH REGISTER FOR TRANSMITTING MESSAGES BETWEEN CASH REGISTERS AND/OR HOST COMPUTER

This application is a continuation of application Ser. No.08/135,345, filed Oct. 13, 1993 (abandoned).

BACKGROUND OF THE INVENTION

1. Field of the Invention

The present invention relates to an electronic cash register in which a message from a manager is displayed on a display unit to inform a register operator of the message.

2. Description of the Related Art

The configuration of use of the conventional electronic cash register (ECR) system includes the case where the system is used in a stand-alone configuration with one ECR and the case where the system is used in a master/slave configuration with a plurality of ECRs.

In the conventional ECR, consideration is given to an error message for providing information of an error of operation but no consideration is given to the handling message from a manager, such as executive or shopkeeper, to the register operator. Accordingly, there is a drawback that in the case where there is information such as "the list of today's recommended goods" or "the list of goods out of stock" which a manager wants to give each register operator notice of, the manager must inform each register operator verbally or by a memo, which makes rapid business operation difficult. Further, in this case, the register operator must pay attention to both the information provided by the manager and a display unit of the ECR. Therefore, an error of register operation is liable to occur and there may be a possibility that the register operator forgets the information provided by the manager. Also, when the information is given verbally or by memo, there may be the case where a bad influence is given to customers.

On the other hand, JP-A-1-321560 has disclosed a system in which identifying means for identifying a customer by a card is connected to memory means and a POS (Point of Sales) terminal and the promotion of sales or a customer service work instruction is display on display means provided in the POS terminal. However, this system has a drawback that the system becomes large in size and high in cost since a card terminal and a CPU are needed.

Also, U.S. Pat. No. 5,053,957 entitled "ELECTRONIC CASH REGISTER HAVING DISCOUNT PRICES SELECTED BY CUSTOMER LEVEL" has disclosed an ECR in which a unit price corresponding to an inputted customer level is selected from among a plurality of unit prices previously stored in storing means and corresponding to a plurality of customer levels. Further, U.S. Pat. No. 4,875,163 entitled "ELECTRONIC CASH REGISTER SYSTEM WITH FASTER ACCESS TIME TO PRICE LOOK-UP FILE" has disclosed an ECR system in which data corresponding to different classes of articles is stored into storage means from a price look-up (PLU) file. When a particular article is processed by this ECR system, access to data stored in the storage means is made to output price data. However, in the system disclosed by these U.S. Patents, it is not possible to display a message from a manager on a display unit to inform a register operator of the message.

SUMMARY OF THE INVENTION

A first object of the present invention made for solving the above problems is to provide an excellent electronic cash register in which a register operator can be informed easily and surely of a message set by a manager through a display unit.

A second object of the present invention is to provide an excellent electronic cash register in which a register operator can be informed easily and surely of a message set by a manager through a display unit during a wait for registration into register.

A third object of the present invention is to provide an excellent electronic cash register in which a message set by a manager can be transmitted rapidly and to a multiplicity of positions and a register operator can be informed easily and surely of the message through a display unit during a wait for registration into register.

A first electronic cash register for attaining the first object is provided with input means for message data, memory means for storing the message data from the input means, display means for displaying the message data to a register operator, and control means for performing a control so that the message data stored in the memory means is displayed by the display means.

A second electronic cash register of the present invention for attaining the second object corresponds to each of a plurality of first electronic cash registers of the present invention which are connected to each other through a transmission path, and the second electronic cash register is provided, in addition with the construction of the first electronic cash register, with transmission means for transmitting the message data stored in the memory means, reception means for receiving message data from the other electronic cash register, reception control means for storing the message data received by the reception means into the memory means, and display control means for controlling display of the message data stored in the memory means by the display means during a wait for registration into register.

A third electronic cash register of the present invention for attaining the third object is provided, in addition with the construction of the first electronic cash register, with line reception means for receiving message data transmitted from a host computer through a public line, line reception control means for storing the message data received by the line reception means into the memory means, and display control means for controlling display of the message data stored in the memory means by the display means during a wait for registration into the register.

A fourth electronic cash register of the present invention for attaining the third object is provided, in addition with the construction of the first electronic cash register, with transmission means for transmitting the message data stored in the memory means to another electronic cash register, reception means for receiving message data from the other electronic cash register, reception control means for storing the message data received by the reception means into the memory means, line reception means for receiving message data transmitted from a host computer through a public line (e.g. Communication link) line reception control means for storing the message data received by the line reception means into the memory means, and display control means for controlling display of the message data stored in the memory means by the display means during a wait for registration into register.

With the construction of the first electronic cash register of the present invention, a message from a manager is stored and displayed. Therefore, a register operator can be informed easily and surely of a message set by a manager through a display unit.

With the construction of the second electronic cash register of the present invention, a message is transmitted to or received from another electronic cash register and the stored message is displayed during a wait for registration into register. Therefore, a register operator can be informed easily and surely of a message set by a manager through a display unit during a wait for registration into the register.

With the construction of the third electronic cash register of the present invention, a message transmitted from a host computer through a public line is stored and the stored message is displayed during a wait for registration into register. Therefore, a message set by an operator can be transmitted rapidly and to a multiplicity of positions and a register operator can be informed easily and surely of the message through a display unit during a wait for registration into the register.

With the construction of the fourth electronic cash register of the present invention, a message is transmitted to or received from another electronic cash register, a message transmitted from a host computer through a public line is stored and the stored message is displayed during a wait for registration into the register. Therefore, a message set by an operator can be transmitted rapidly and to a multiplicity of positions and a register operator can be informed easily and surely of the message through a display unit during a wait for registration into the register.

DESCRIPTION OF THE PREFERRED EMBODIMENTS

Embodiments of the present invention will now be explained in detail by use of the accompanying drawings.

Figure 1:
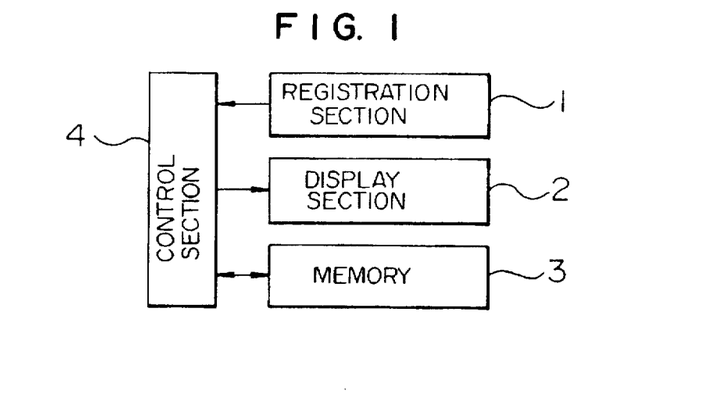
FIG. 1 is a block diagram showing the construction of an electronic cash register according to a first embodiment of the present invention.

FIG. 1 is a block diagram showing the construction of an electronic cash register according to a first embodiment of the present invention. This embodiment corresponds to the first object of the present invention.

In FIG. 1, reference numeral 1 designates a registration section for registering message data, numeral 2 a display section for displaying the message data by a display unit for register operator, numeral 3 a memory, and numeral 4 a control section for controlling the message data registration section 1 and the message display section 2 by use of the memory 3.

Figure 2:
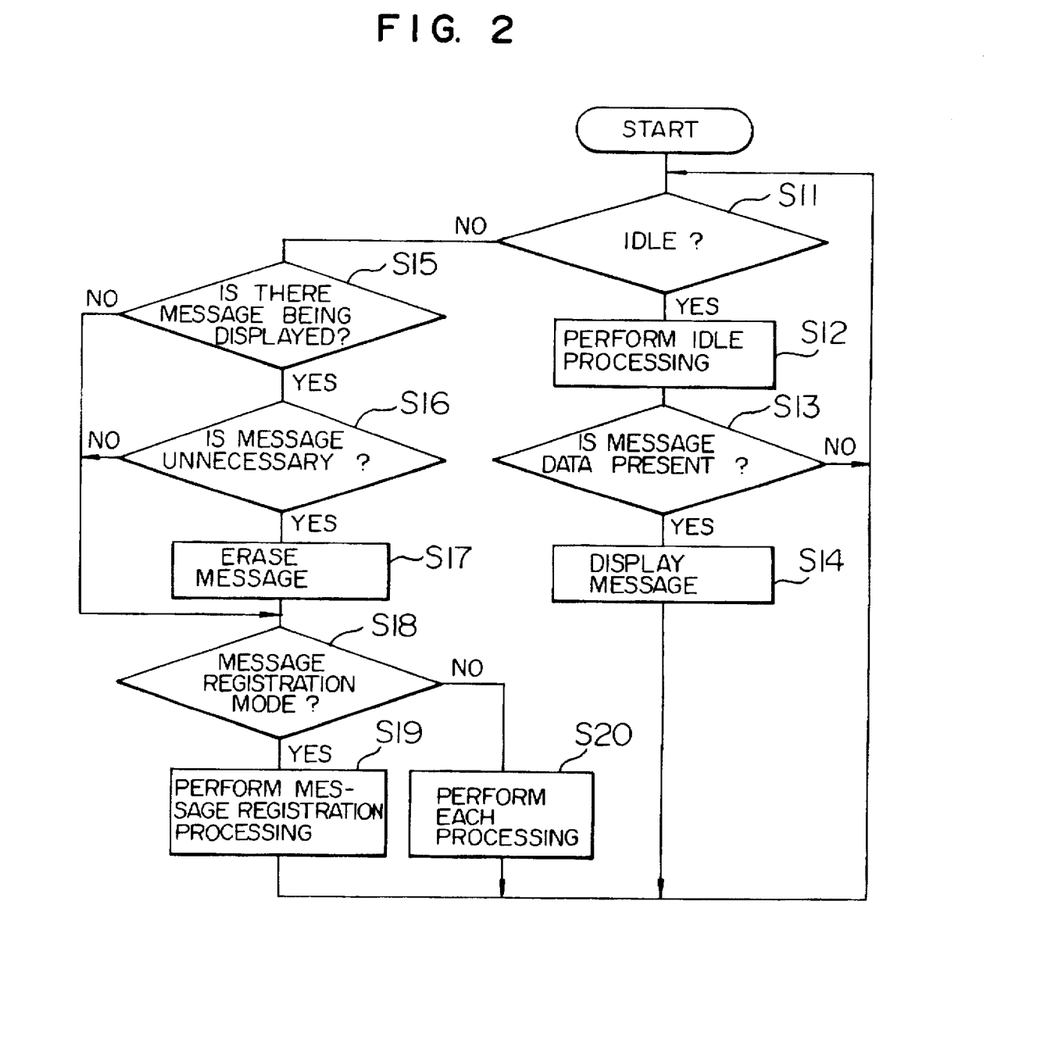
FIG. 2 is a flow chart showing the procedure of a processing for the operation of the first embodiment.

Next, the operation of the first embodiment will be explained. FIG. 2 is a flow chart showing the procedure of processing for the operation of the first embodiment. First, the judgement is made as to whether or not the ECR is in a registration wait condition, that is, an idle condition (step S11). In the case where the ECR is in a registration wait condition, an idle processing is performed (step S12). Thereafter, the judgement is made as to whether or not message data has been registered (step S13). If the message data has been registered, the message is displayed by the display section 2 (step S14). On the other hand, in the case where the ECR is not in a registration wait condition, the presence/absence of a message being displayed is judged (step S15). When the message being displayed is not necessary (step S16), the message is erased from display (step S17). In the case where the ECR is in a message registration mode (step S18), a message registration processing is performed (step S19). In the case where the ECR is not in a message registration mode, another processing is performed (step S20).

Next, a second embodiment of the present invention will be explained. The second embodiment corresponds to the second object of the present invention.

Figure 3:
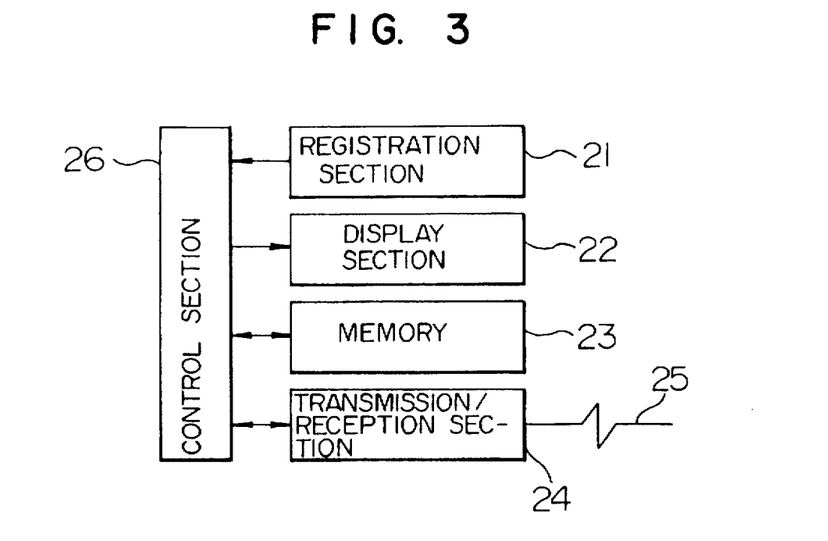
FIG. 3 is a block diagram showing the construction of each electronic cash register used in a second embodiment of the present invention.

FIG. 3 is a block diagram showing the construction of the second embodiment. In the second embodiment, a transmission/reception section 24 for making transmission to or from other ECR's through a dedicated transmission path 25 is provided in addition to the construction of the first embodiment shown in FIG. 1. A control section 26 controls a registration section 21, a display section 22 and the transmission/reception section 24 by used of a memory 23.

Figure 4:
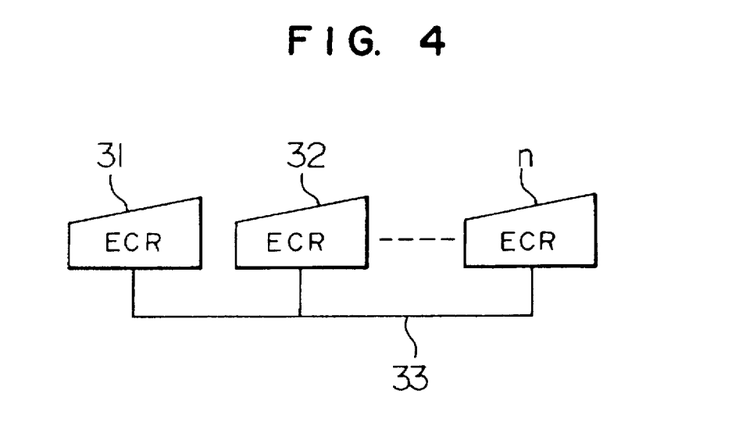
FIG. 4 is a block diagram showing the whole construction according to the second embodiment.

FIG. 4 is a schematic diagram showing the construction of the whole of an electronic cash register system used in the second embodiment. In FIG. 4, ECR's 31, 32, - - - n are connected by a transmission path 33.

Figure 5:
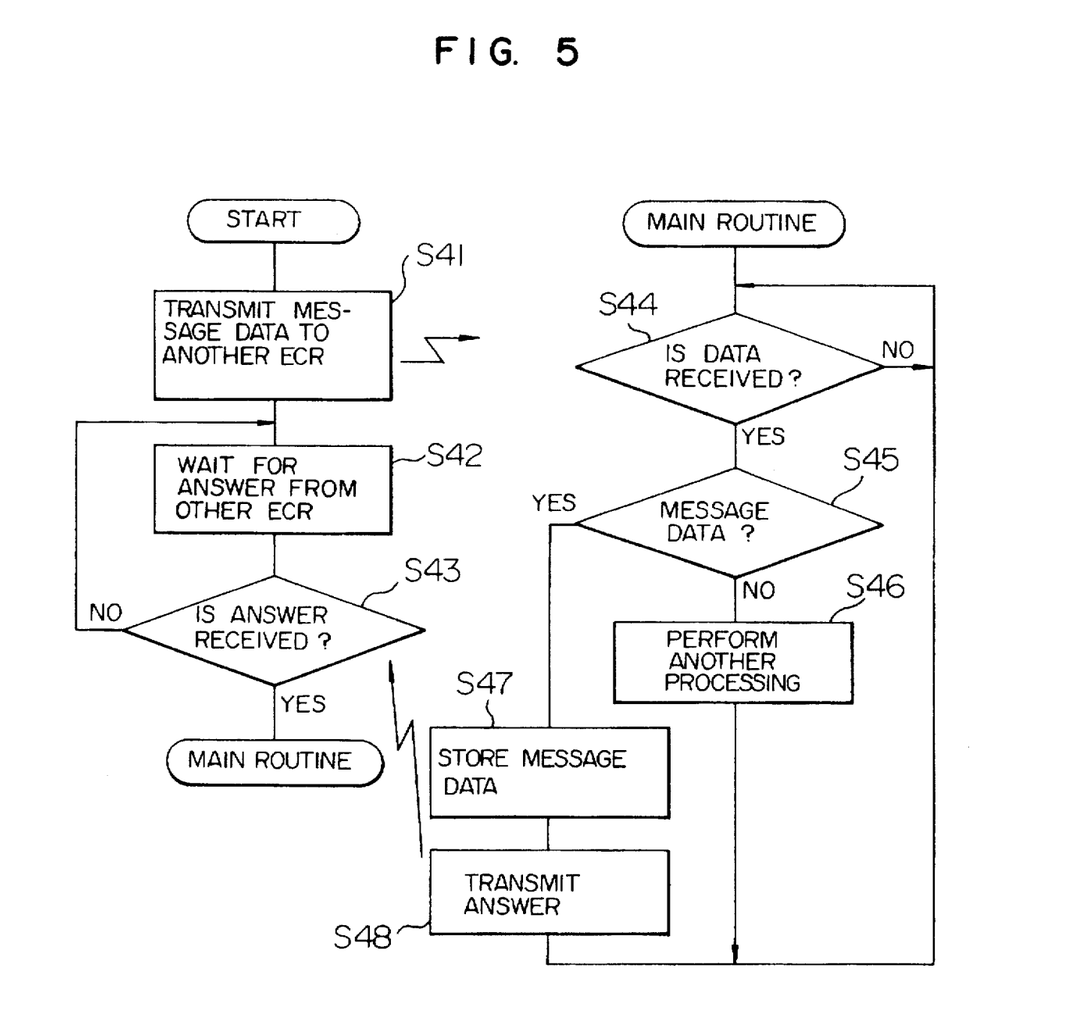
FIG. 5 is a flow chart showing the procedure of a processing for the operation of the second embodiment.

FIG. 5 is a flow chart for explaining the procedure of a processing for the operation of the second embodiment. A transmitting ECR transmits message data to another ECR (step S41) and waits for answers from the other ECR (steps S42 and S43). Another or receiving ECR connected to the transmitting ECR makes the judgement as to whether data is received (step S44). In the case where the received data is data other than message data (step S45), the receiving ECR performs each processing (step S46). In the case where the received data is message data (step S45), the receiving ECR stores the data (step S47) and transmits an answer to the transmitting ECR (step S48).

Next, a third embodiment of the present invention will be explained. The third embodiment corresponds to the third object of the present invention.

Figure 6:
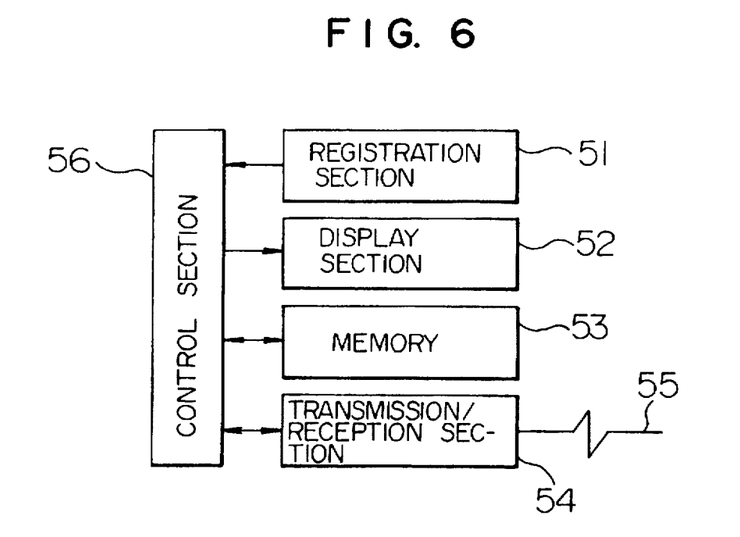
FIG. 6 is a block diagram showing the construction of an electronic cash register used in a third embodiment of the present invention.

FIG. 6 is a block diagram showing the construction of the third embodiment. In the third embodiment, a transmission/reception section 54 for making transmission to or from a host computer (not shown) through a public line 55 is provided in addition to the construction of the first embodiment shown in FIG. 1. A control section 56 controls a registration section 51, a display section 52 and the transmission/reception section 54 by used of a memory 53.

Figure 7:
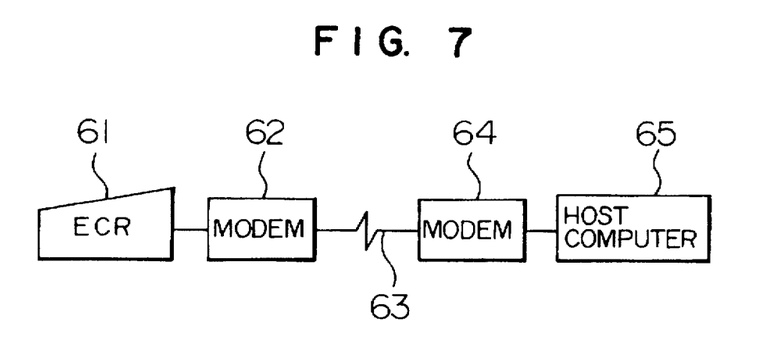
FIG. 7 is a block diagram showing the whole construction according to the third embodiment.

FIG. 7 is a schematic diagram showing the construction of the whole of an electronic cash register system used in the third embodiment. In FIG. 7, an ECR 61 is connected to a host computer 65 by MODEM's 62 and 64 through a public line 63.

Figure 8:
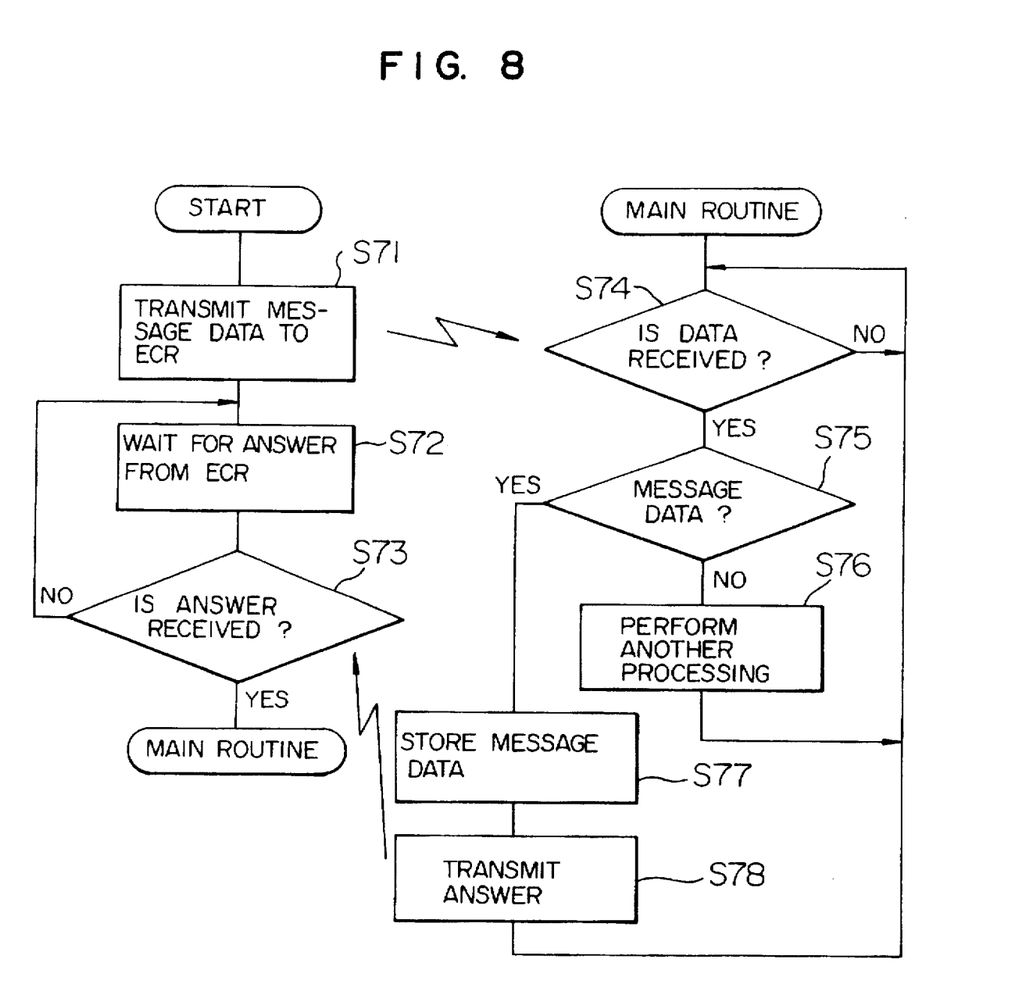
FIG. 8 is a flow chart showing the procedure of a processing for the operation of the third embodiment.

FIG. 8 is a flow chart showing the procedure of a processing for the operation of the third embodiment. The host computer transmits message data to the ECR (step S71) and waits for an answer from the ECR (steps S72 and S73). The ECR makes the judgement as to whether or not data is received (step S74). In the case where the received data is data other than message data (step S75), the ECR performs each processing (step S76). In the case where the received data is message data, the ECR stores the data (step S77) and transmits an answer to the host computer (step S78).

Next, a fourth embodiment of the present invention will be explained.

Figure 9:
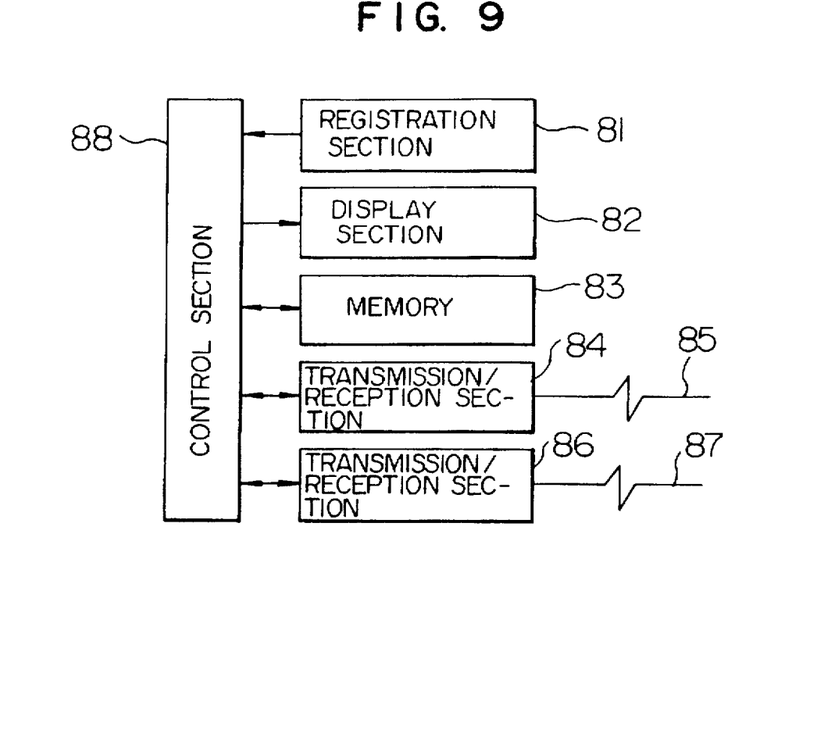
FIG. 9 is a block diagram showing the construction of each electronic cash register used in a fourth embodiment of the present invention.

FIG. 9 is a block diagram showing the construction of a main part of the fourth embodiment. In the fourth embodiment, a transmission/reception section 84 for making transmission to or from another ECR through a dedicated transmission path 85 and a transmission/reception section 86 for making transmission to or from a host computer through a public line 87 are provided in addition to the construction of the first embodiment shown in FIG. 1. A control section 88 controls a registration section 81, a display section 82, the transmission/reception section 84 and the transmission/reception section 86 by used of a memory 83.

Figure 10:
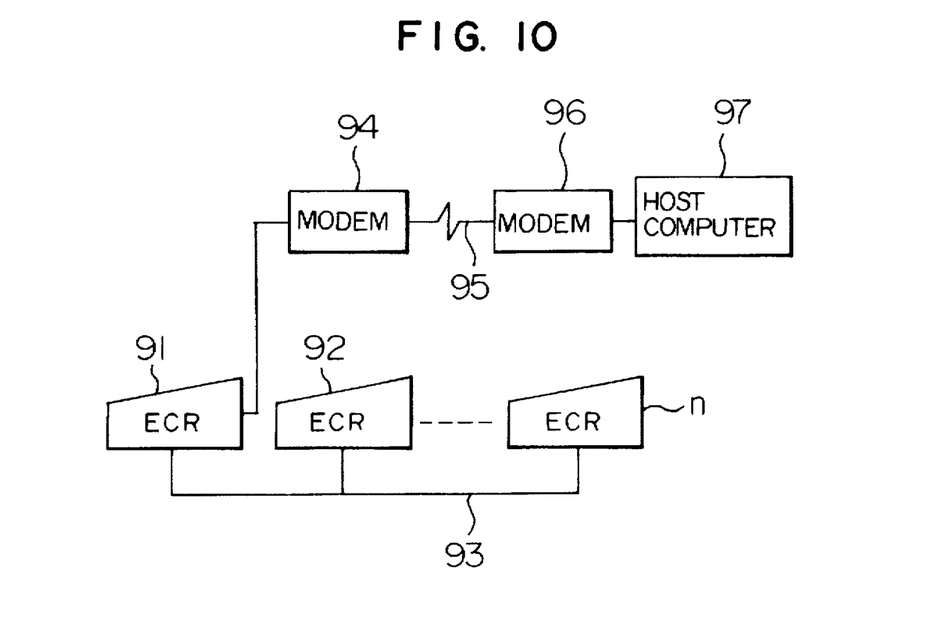
FIG. 10 is a block diagram showing the whole construction according to the fourth embodiment.

FIG. 10 is a schematic diagram showing the construction of the whole of an electronic cash register system used in the fourth embodiment. In FIG. 10, ECR's 91, 92, - - - n are connected through a transmission path 93. The ECR 91 (i.e. Master ECR) is connected to a host computer 97 by MODEM's 94 and 96 through a public line 97.

Figure 11:
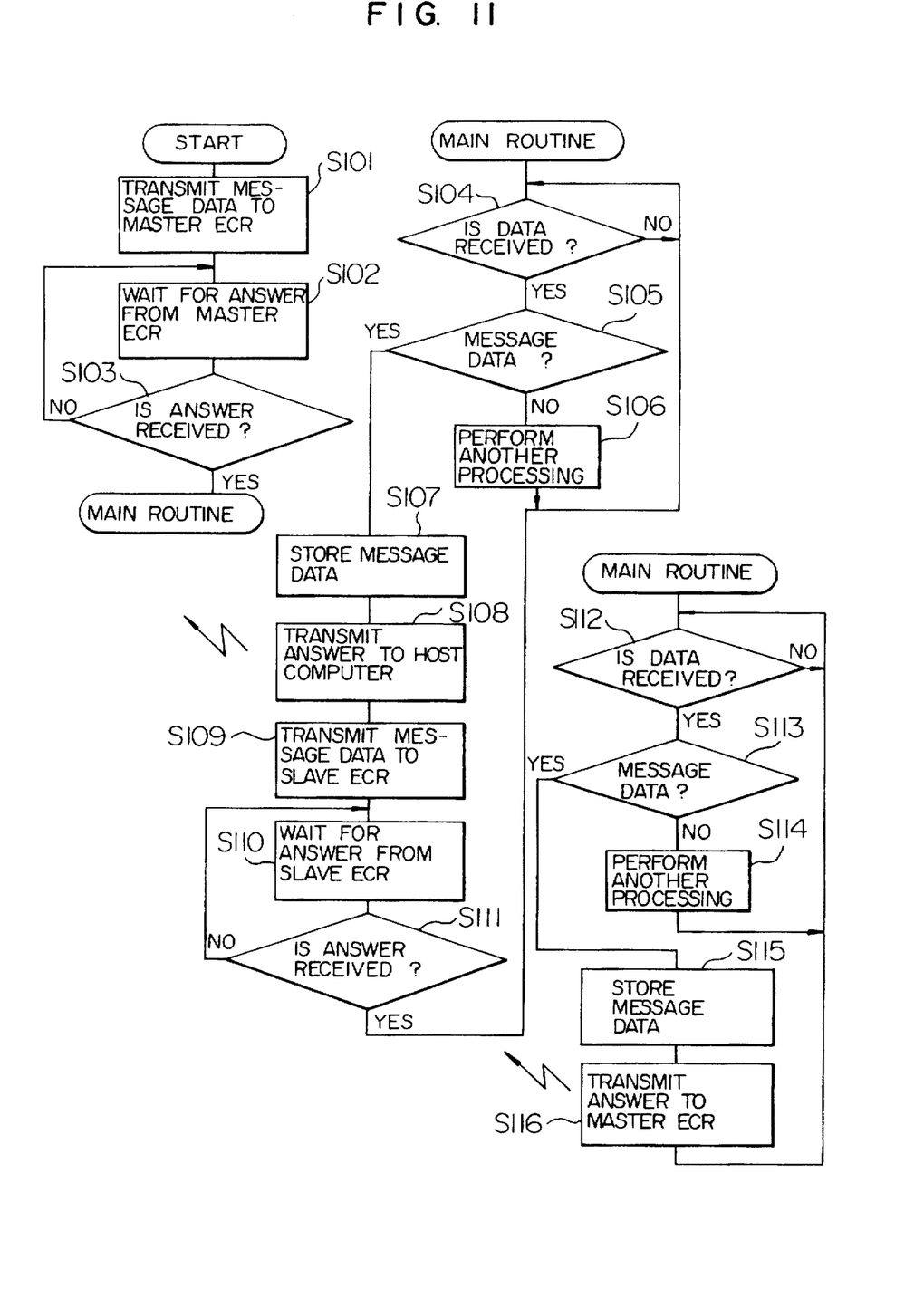
FIG. 11 is a flow chart showing the procedure of a processing for the operation of the fourth embodiment.

FIG. 11 is a flow chart showing the procedure of a processing for the operation of the fourth embodiment. The host computer transmits message data to a master ECR (or parent equipment) (step S101) and waits for an answer from the master ECR (steps S102 and S103). The master ECR makes the judgement as to whether or not data is received (step S104). In the case where the received data is data other than message data (step S105), the master ECR performs each processing (step S106). In the case where the received data is message data, the master ECR stores the data (step S107) and transmits an answer to the host computer (step S108). Thereafter, the master ECR transmits the message data to another or slave ECR (or child equipment) (step S109) and waits for an answer from the slave ECR (steps S110 and S111). The slave ECR connected to the master ECR makes the judgement as to whether data is received (step S112). In the case where the received data is data other than message data (step S113), the slave ECR performs each processing (step S114). In the case where the received data is message data, the slave ECR stores the data (step S115) and transmits an answer to the master ECR (step S116).

As apparent from the foregoing explanation, in the first electronic cash register according to the first embodiment of the present invention, a message from a manager is stored and displayed. Accordingly, there is provided an effect that a register operator can be informed easily and surely of a message set by a manager through a display unit.

In the second electronic cash register according to the second embodiment of the present invention, a message is transmitted to or received from another electronic cash register and the stored message is displayed during a wait for registration into register. Accordingly, there is provided an effect that a register operator can be informed easily and surely of a message set by a manager through a display unit during a wait for registration into register.

In the third electronic cash register according to the third embodiment of the present invention, a message transmitted from a host computer through a public line is stored and the stored message is displayed during a wait for registration into register. Accordingly, there is provided an effect that a message set by an operator can be transmitted rapidly and to a multiplicity of positions and a register operator can be informed easily and surely of the message through a display unit during a wait for registration into register.

In the fourth electronic cash register according to the fourth embodiment of the present invention, a message is transmitted to or received from another electronic cash register, a message transmitted from a host computer through a public line is stored and the stored message stored is displayed during a wait for registration into register. Accordingly, there is provided an effect that a message set by an operator can be transmitted rapidly and to a multiplicity of positions and a register operator can be informed easily and surely of the message through a display unit during a wait for registration into register.

I claim:

1. An electronic cash register comprising:

input means for inputting operator message data for use by an operator of the electronic cash register;

memory means, operatively associated with said input means, for storing the message data input by said input means;

display means, operatively associated with said memory means, for displaying data to be registered and the message data stored in said memory means; and control means, operatively associated with said memory means and said display means, for (i) controlling said display means, when said register is awaiting input of said data to be registered, to display the message data stored in said memory means, (ii) controlling said register, when data to be registered is input while said message data is being displayed, to perform processing and (iii) controlling said display means to erase the displayed message data in response to a determination that displaying of said message data is not necessary.

2. An electronic cash register according to claim 1, further comprising:

transmission means for transmitting, when the electronic cash register is connected to a second electronic cash register through a transmission path, the message data stored in said memory means of said register to said second electronic cash register;

reception means for receiving message data from said second electronic cash register; and reception control means for storing the message data received by said reception means into said memory means of said register.

3. An electronic cash register according to claim 1, further comprising:

line reception means for receiving, when the electronic cash register is connected to a host computer through a public line, message data transmitted from said host computer; and line reception control means for storing the message data received by said line reception means into said memory means.

4. An electronic cash register according to claim 1, further comprising:

transmission means for transmitting, when the electronic cash register is connected to a second electronic cash register through a transmission path, the message data stored in said memory means of said register to said second electronic cash register;

reception means for receiving message data from said second electronic cash register;

reception control means for storing the message data received by said reception means into said memory means of said register;

line reception means for receiving, when said electronic cash register is connected to a host computer through a public line, message data transmitted from said host computer.

line reception control means for storing the message data received by said line reception means into said memory means of said register.

5. An electronic cash register comprising:

input means for inputting operator message data for use by an operator of the electronic cash register;

a memory, operatively associated with said input means, which stores the message data input by said input means;

a display, operatively associated with said memory, which displays data to be registered and the message data stored in said memory; and control means, operatively associated with said memory and said display, for (i) controlling said display, when said register is awaiting input of said data to be registered, to display the message data stored in said memory, (ii) controlling said register, when data to be registered is input while said message data is being displayed, to perform processing and (iii) controlling said display means to erase the displayed message data in response to a determination that displaying of said message data is not necessary.

6. An electronic cash register according to claim 5, further comprising:

transmission means for transmitting, when the electronic cash register is connected to a second electronic cash register through a transmission path, the message data stored in said memory of said register to said second electronic cash register;

reception means for receiving message data from said second electronic cash register; and reception control means for storing the message data received by said reception means into said memory of said register.

7. An electronic cash register according to claim 5, further comprising:

line reception means for receiving, when the electronic cash register is connected to a host computer through a public line, message data transmitted from said host computer; and line reception control means for storing the message data received by said line reception means into said memory.

8. An electronic cash register according to claim 5, further comprising:

transmission means for transmitting, when the electronic cash register is connected to a second electronic cash register through a transmission path, the message data stored in said memory of said register to said second electronic cash register;

reception means for receiving message data from said second electronic cash register;

reception control means for storing the message data received by said reception means into said memory of said register;

line reception means for receiving, when said electronic cash register is connected to a host computer through a public line, message data transmitted from said host computer; and line reception control means for storing the message data received by said line reception means into said memory of said register.

* * * * *